United States Patent
Chang et al.

(10) Patent No.: US 6,690,774 B1
(45) Date of Patent: Feb. 10, 2004

(54) VOICE MAIL WITNESS

(75) Inventors: E-Lee Chang, Mableton, GA (US); Edward Michael Silver, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/953,997

(22) Filed: Sep. 17, 2001

(51) Int. Cl.[7] .............................................. H04M 1/64
(52) U.S. Cl. .............................. 379/88.23; 379/88.18; 379/40; 379/42
(58) Field of Search ...................... 379/88.18, 88.19, 379/88.2, 88.21, 74, 75, 37, 38, 39, 40, 41, 42, 44

(56) References Cited

U.S. PATENT DOCUMENTS

| | | | | |
|---|---|---|---|---|
| 4,931,769 A | * | 6/1990 | Phillips et al. | 340/541 |
| 5,003,577 A | * | 3/1991 | Ertz et al. | 379/88.13 |
| 5,010,567 A | * | 4/1991 | Tsushima | 379/77 |
| 5,701,301 A | | 12/1997 | Weisser, Jr. | 370/428 |
| 5,729,596 A | * | 3/1998 | Reeder et al. | 379/102.04 |
| 5,978,939 A | * | 11/1999 | Mizoguchi et al. | 714/55 |
| 6,157,464 A | * | 12/2000 | Bloomfield et al. | 358/407 |
| 6,192,118 B1 | * | 2/2001 | Bayless et al. | 379/201.01 |
| 6,438,632 B1 | * | 8/2002 | Kikugawa | 710/100 |
| 6,510,315 B1 | * | 1/2003 | Arnson | 455/404 |

* cited by examiner

Primary Examiner—Fan Tsang
Assistant Examiner—Ming Chow
(74) Attorney, Agent, or Firm—Woodcock Washburn LLP

(57) ABSTRACT

A method for recording an audible event includes receiving an incoming call from a calling party on a first calling line. The incoming call is connected to a voice mailbox associated with a voicemail witness service. An extended timeout period associated with the incoming call. Telecommunications data associated with an audible event is received over the first calling line for up to the extended timeout period. A voicemail witness record is generated by storing a representation of the received telecommunications data and associating the stored representation with the calling party.

24 Claims, 6 Drawing Sheets

VOICE MAIL WITNESS

FIELD OF THE INVENTION

This invention relates to telecommunication systems. More particularly, the invention relates to systems and methods for recording an audible event via a voicemail witness service.

BACKGROUND OF THE INVENTION

Unfortunately, individuals sometimes find themselves wishing they had had a witness to an event as the event was occurring. For example, the individual might have been robbed and, without a witness, might have insufficient evidence to convict or even to identify the robber. Similarly, if an individual is attacked, and no witness is available or willing to testify, the individual might not be able to make a convincing criminal or civil case against his attacker.

In such situations, the individual could call a predefined emergency telephone number, such as 911, to request assistance from the police, for example. By the time the police arrive, however, the incident is usually over, the attacker has fled, and the individual's case has been reduced to his word against the attacker's.

In some situations, the individual might not even be sure that a call to the police is warranted. For example, the individual might be waiting in a disabled vehicle on the side of the road for help to arrive. When another motorist, for example, pulls over and approaches, the individual cannot be sure, at least initially, whether the motorist has stopped to help the individual, or to harm him. If the motorist stopped to help, there is no problem. If, on the other hand, the motorist stopped to harm him, the individual might like to have a recording of the event.

In any of the above described scenarios, if the individual has a telephone at hand, the individual could call a voicemail service and place the phone at a location where the events can be recorded, at least to the extent that the events are audible. Typical voicemail services, however, strictly limit message length, usually to only a couple of minutes. Such limitations might prevent the individual from generating a meaningful record. Additionally, if the attacker found the telephone, the attacker could simply force the individual to delete the message from the voicemail service.

It would be advantageous, therefore, to individuals in such situations if systems and methods were available whereby the individual could initiate a voice mail recording of an event as it is occurring, in a manner such that the record would be long enough to be meaningful. Such systems and methods would be particularly advantageous if they were provided such that an attacker could not force a victim to alter or delete the record. Hence, there is a need in the art for systems and methods for recording an audible event via a voicemail witness service.

BRIEF SUMMARY OF THE INVENTION

The invention satisfies the aforementioned needs in the art by providing systems and methods for recording an audible event via a voicemail witness service. Voicemail witness allows people in potentially dangerous situations to create a voicemail record of their encounter, as well as to receive help if they need it. This service can be provided to people with voice mail, who are accessing their voice mail with devices that have microphones such as cellular phones, home phones, and computers. The voicemail witness service includes a voice mailbox that can hold an extended message, e.g., a recording of about 30-minutes or more. A person can activate the voicemail witness by dialing into their voice mail system then dial a predefined number, such as 911, after gaining access.

Once the voicemail witness is activated, it continues to record until the person deactivates it with the correct passcode or until the end of the recording time is reached. If the recording is deactivated with the correct passcode, then the recording will not be retained. However, if the recording is stopped without the entry of the correct passcode or if the end of the recording time is reached, the recording along with caller id information can be provided automatically to an emergency service, such as 911, so that help can be dispatched.

To prevent false alarms from occurring, if the voicemail witness has notified 911, but the user wishes to stop officers from being dispatched, the user can do so by accessing the voicemail witness to enter the correct passcode within a user-designated time period. At that time, the caller id information along with a message would be sent to inform a 911 operator that the earlier voicemail witness recording received from the caller was a false alarm.

BRIEF DESCRIPTION OF THE SEVERAL VIEWS OF THE DRAWING

Other features of the invention are further apparent from the following detailed description of the embodiments of the present invention taken in conjunction with the accompanying drawing, of which.

DETAILED DESCRIPTION OF PREFERRED EMBODIMENTS OF THE INVENTION

Figure 1:
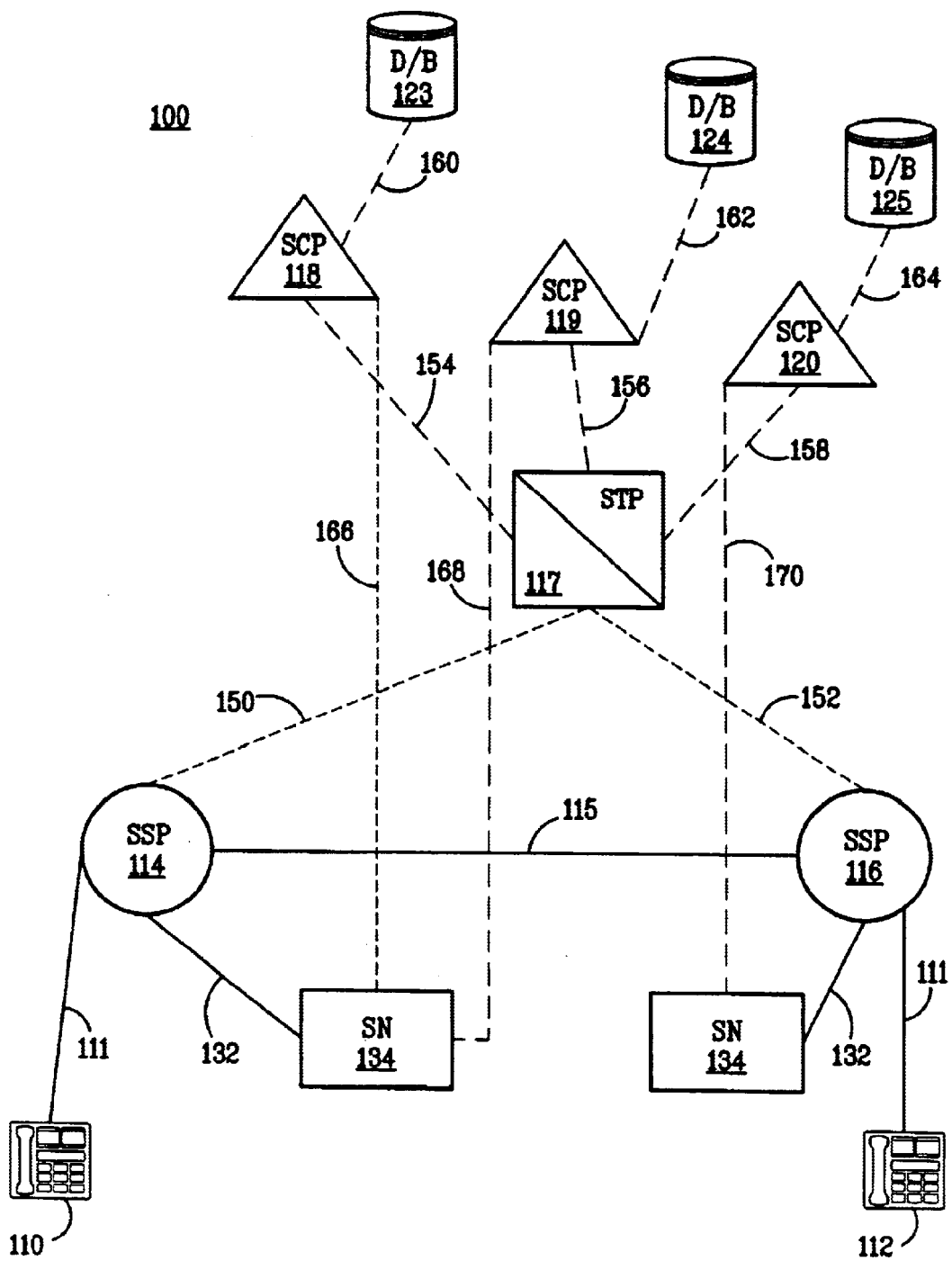
FIG. 1 is a block diagram of an exemplary telecommunications network in which the principles of the invention can be employed.

FIG. 1 is a block diagram of an exemplary telecommunication network 100, such as a public switched telecommunications network (PSTN), in which the principles of the invention can be employed. More particularly, FIG. 1 illustrates a simplified advanced intelligent network (AIN). AIN systems are described in U.S. Pat. No. 5,701,301, the disclosure of which is hereby incorporated herein by reference. Though the various features and aspects of the invention can be utilized in conjunction with an AIN, it should be understood that the invention is not limited to AIN-based systems, and that other networks and system arrangements can be used in accordance with the invention.

As shown, the AIN 100 can include a plurality of service switching points (SSPs) 114, 116. SSPs 114, 116 are capable of generating AIN queries. An SSP, which is also known as a "central office," is basically a switch and the terms are used interchangeably herein. SSPs 114 and 116 can comprise, for example, DMS100 or 5ESS switches. These switches can be manufactured by, for example, Lucent Technologies, Inc. or Nortel Networks.

Each of the SSPs 114, 116 can have one or more subscriber lines 111 connected thereto. Subscriber lines 111 may also be referred to as calling lines. Each SSP 114, 116 serves a designated group of calling lines 111, and thus, the SSP that serves a particular calling line may be referred to as its serving switch. Typically, each calling line 111 is connected to one or more pieces of terminating equipment 110, 112, such as a telephones, facsimile machines, computers, modems, or other such telecommunication devices.

SSPs 114, 116 are interconnected by one or more trunk circuits 115. Trunks 115 are basically the voice paths via which communications are connected between SSPs. The term "communication" or "call" is used herein to include all messages that may be exchanged between the calling party and the called party in a telecommunication network, such as illustrated in FIG. 1. Trunk 115 can be either a Signaling System 7 (SS7) controlled multi-frequency (MF) trunk, or primary rate interface (PRI) trunk or the like. The type of trunk will be in accordance with both the sending and receiving SSP to which it is connected.

Each SSP 114, 116 can include different types of facilities and/or triggers. SSPs 114 and 116 are programmable switches that can perform some or all of the following functions: recognize AIN-type calls, launch queries, and receive commands and data to further process and route AIN-type calls. When one of SSPs 114 or 116 is triggered by an AIN-type call, the triggered SSP 114 or 116 formulates and sends an AIN query. Based on the reply from the AIN network, SSP 114 or 116 responds to call processing instructions received.

Each of SSPs 114 and 116 is connected to a signal transfer point (STP) 117 via respective data links 150, 152. Data links 150, 152 can employ SS7, for example, though it should be understood that any suitable signaling protocol could be employed. To facilitate signaling and data messaging, each SSP 114 and 116 can be equipped with Common Channel Signaling (CCS) capabilities, e.g., SS7, which provides two-way communications of data messages over CCS links 150 and 152 between components of the AIN network. The data messages can be formatted in accordance with the Transaction Capabilities Applications Part (TCAP). Alternatively, Integrated Service Digital Network (ISDN) Users Part (ISUP) can be used for signaling purposes between, for example, SSPs 114 and 116. In such a case, SSPs 114 and 116 can be equipped with the capability to map appropriate data between TCAP and ISUP protocols, and vice versa. The telephone network basically employs an upper-level software controlled network through the STPs and the SCP.

SSPs 114 and 116 may allow normal switch processing to be suspended at specific points in a call so that the switch can send an AIN message query via signaling transfer point (STP) 117 to SCP 118, 119 or 120. SCP 118, 119 or 120 may execute software based service logic and return call-processing instructions to the triggering AIN SSP. New services may be provisioned by assigning AIN SSP triggers to customer lines, trunks, and/or NANP (North American Numbering Plan) telephone numbers.

Much of the intelligence of the AIN resides in a type of AIN element referred to as a service control point (SCP) 118, 119, 120 that is connected to STP 117 over an SS7 data link, or the like, 154, 156 or 158. Accordingly, the connections by links 150, 152, 154, 156, and 158 are for signaling purposes and allow SSPs 114 and 116 to send messages to, and receive messages from, SCP 118, 119 and 120.

Among the functions performed by SCP 118, 119, 120 is the hosting of network databases and subscriber databases, which may be stored in respective data storage objects 123, 124, 125. For example, data storage object 123 is shown as a database communicatively coupled to SCP 118, although data storage object 123 can be embodied as a component within SCP 118, such as an internally-mounted hard disk device. The databases stored in data storage object 123 may be used in providing telecommunications services to a customer. Typically, SCP 118, 119, 120 is also the repository of service package applications (SPAs) that are used in the application of telecommunication services, enhanced features, or subscriber services to calling lines. Additionally, SPAs may use databases for providing telecommunication services.

A set of triggers can be defined at the SSPs 114, 116. A trigger in the AIN is an event associated with a particular call that initiates a query to be sent to SCP 118, 119, or 120. The trigger causes selected SCP 118, 119, or 120 to access, if necessary, its respective database 123, 124, or 125 for processing instructions with respect to the particular call. The results of the SCP processing and/or database inquiry is/are sent back to selected SSP 114 or 116 in a response through STP 117. The return packet includes instructions to SSP 114, 116 as to how to process the call. The instructions may be to take some special action as a result of a customized calling service, enhanced feature, or subscriber service. In response, switch 114, 116 moves through its call states, collects the called digits, and generates further packets that are used to set up and route calls. Similar devices for routing calls among various local exchange carriers are provided by regional STP and regional SCP.

An example of such a trigger is a termination attempt trigger (TAT), which causes a query to be sent to SCP 118, 119, or 120 whenever an attempt is made to terminate a call on the line of subscriber 110 or 112. Another type of trigger that may be used is a Public Office Dialing Plan (PODP) trigger, though it should be understood that the principles of the invention include the use of other triggers.

The AIN can also include a services circuit node 134 (SCN), which may also be referred to herein as a services node (SN). SN 134 is an interactive data system that acts as a switch to transfer calls. SN 134 may provide interactive help, collect voice information from participants in a call, and/or provide notification functions. SN 134 can be a Lucent Technologies Star Server FT Model 3200 or Model 3300 although other such devices can be employed. SN 134 can include voice and dual tone multi-frequency (DTMF) signal recognition devices and/or voice synthesis devices. In addition, SN 134 can include a data assembly interface. SN 134 can be connected to local SCP 118, 119, 120 via respective data links 166, 168, 170 using an X.25, SS7 or TCP/IP protocol or any other suitable protocol. In addition, SN 134 typically may be connected to one or more (but usually only a few) SSPs via Integrated Service Digital Network (ISDN) lines or any other kind of suitable telephone lines 132.

One skilled in the art will further recognize that the above-described network is a simplified network meant for explanatory purposes. It is likely that a telephone network might include numerous user stations, SSPs, STPs, SCPs, and SNs along with other telephone network elements, and can employ other types of triggers without departing from the spirit and scope of the invention.

Figure 2:
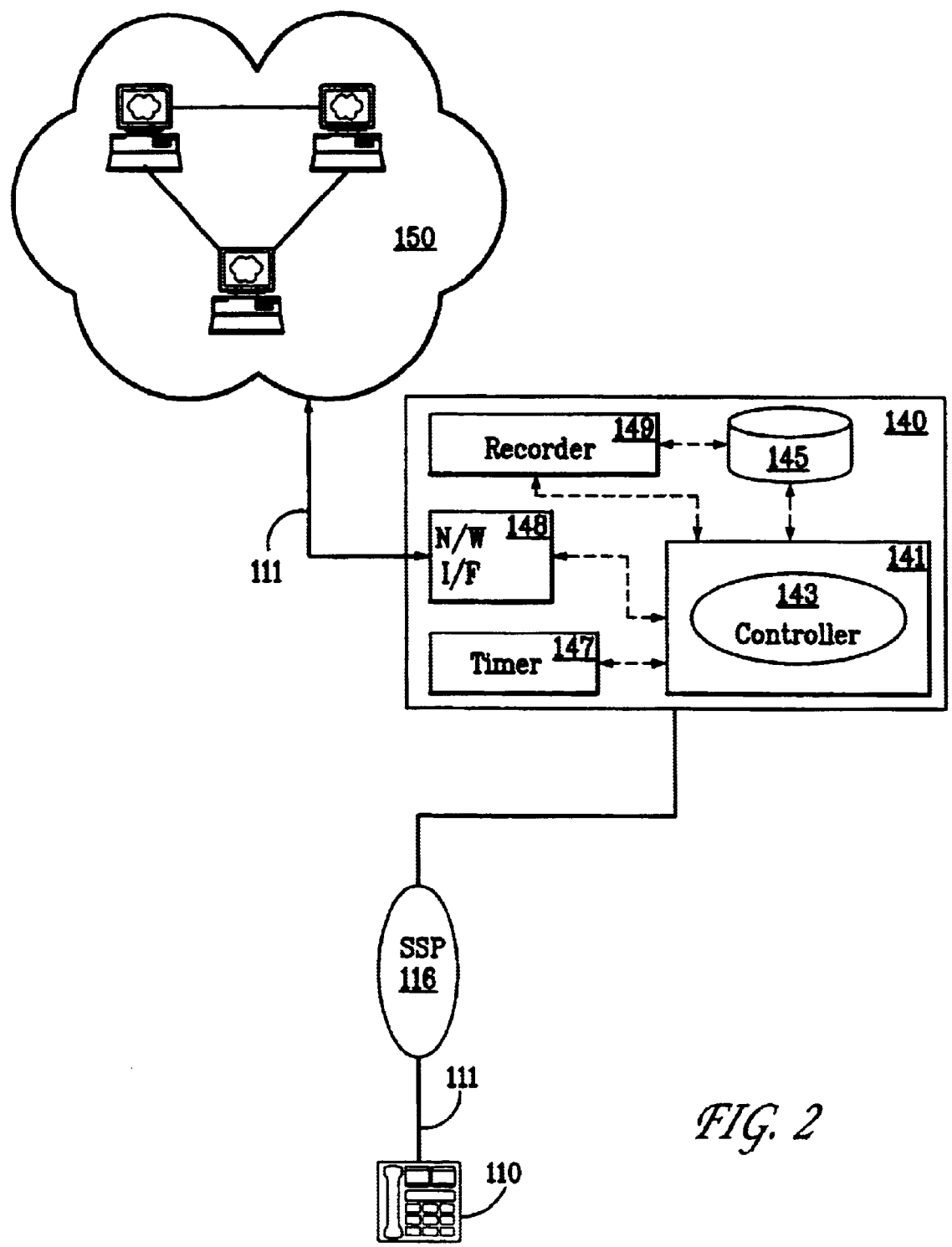
FIG. 2 is a block diagram of a voicemail witness system according to the invention for recording an audible event.

FIG. 2 is a block diagram of a portion of an exemplary AIN-based telephone system in which the present invention may be embodied. For illustration purposes, as seen in FIG. 2, the present invention can be embodied in a service node 140 of an AIN-based telephone system. That is, the service node 140 can include a computer-readable medium having computer-executable instructions thereon for performing a method according to the invention. The present invention can be, however, implemented in other components of an AIN-based telephone network, or in any other telephone network or system. Consequently, the present invention should not be construed to be limited to AIN-based systems.

According to the invention, the calling party uses telephone 110 to call into the voicemail witness service, which can be provided as an option in an existing voicemail service, or as a standalone service. As a result of the calling party's initiating the call to the number associated with the voicemail witness service, the incoming call is connected to the service node 140. As shown, the calling party telephone 110 can be coupled to the service node 140 via a calling line 111 and SSP 116. The service node 140 receives the call from the calling party, parses the called party information from the call to determine the called number, determines from the called number that the call is to be directed to the voicemail witness service, and connects the call to the voicemail witness service.

Generally speaking, the service node 140 according to the invention can include a voicemail controller 141 and a data store 145. Preferably, the voicemail controller 141 is implemented as a computer program in a microprocessor 143 that controls the operation of the voicemail witness system. The data store 145 can be a database or other memory capable of storing voicemail witness records, logs associated with the voicemail witness records, and data associated with subscribers to, or users of, the voicemail witness service. In this regard, the data store 145 comprises a voice mailbox associated with the voicemail witness service.

The service node 140 can also include a timer 147 that includes a clocking means. The controller 141 sets and monitors the timer 147 whenever such timing is necessary (e.g., to determine whether the maximum message recording time has expired). The service node 140 also includes a recording means 149 for receiving telecommunications data from the incoming call, and writing to the data store, a representation of the telecommunications data that forms the voicemail witness record. The service node 140 can also include network connection means 148 for establishing a connection, such as an Internet connection, to a network 150, such as a telephone network maintained by an emergency service, such as 911, for example.

Figure 3A:
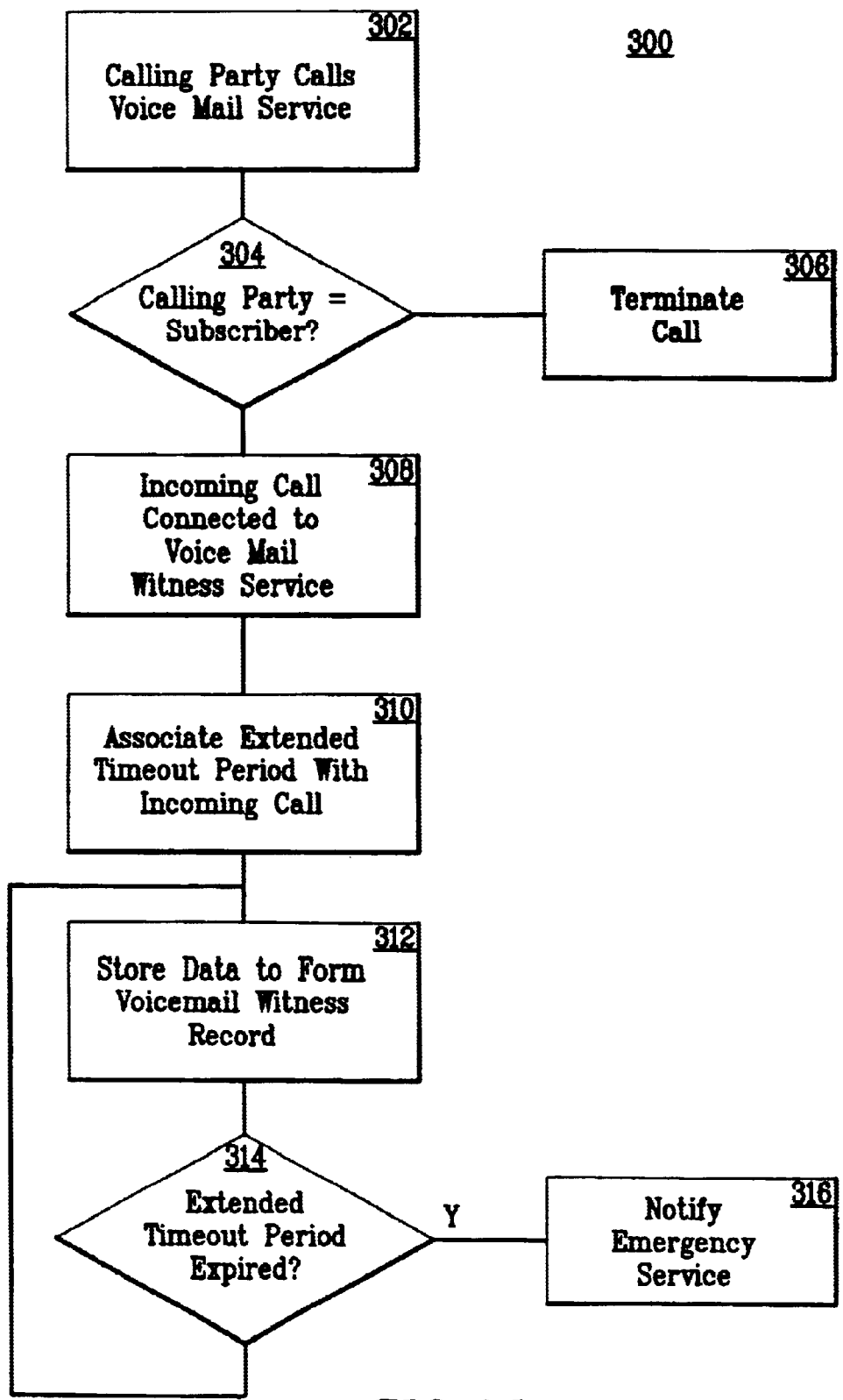
FIGS. 3A–3D provide a flowchart of a preferred embodiment of a method according to the invention for recording an audible event.

FIG. 3A is a flowchart of a method 300 according to the invention for recording an audible event. At step 302, a calling party phones into a voice mail witness service. As described above, the calling party's telephone can be connected to the voicemail service via a calling line. A calling line number, such as the calling party's telephone number, is associated with the calling line.

Preferably, the voice mail witness service is provided as an option of an existing voice mail service to which the calling party is, presumably, a subscriber. In such an embodiment, the calling party can dial into the existing voice mail service, which then offers a menu of options to the calling party. Typically, such options include listening to new or saved messages, recording messages, and deleting or saving messages. According to the invention, one of the options that the voice mail service provides is to connect the calling party to a voice mailbox associated with the voice mail witness service. The calling party can select this option from the menu and, in response, the voice mail service connects the call to the voice mailbox associated with the voice mail witness service.

Alternatively, the voice mail witness service can be a separate service having its own predefined access number. That is, the calling party can call a predefined number, such a *44, for example, that would connect the calling party directly to the voicemail witness service. In such an embodiment, the system would detect the incoming call to the predefined access number, and connect the call to the voice mailbox associated with the voicemail witness service. Thus, according to the invention, the system receives an incoming call from the calling party on a first calling line, and connects the call to a voice mailbox associated with the voicemail witness service.

Figure 3B:
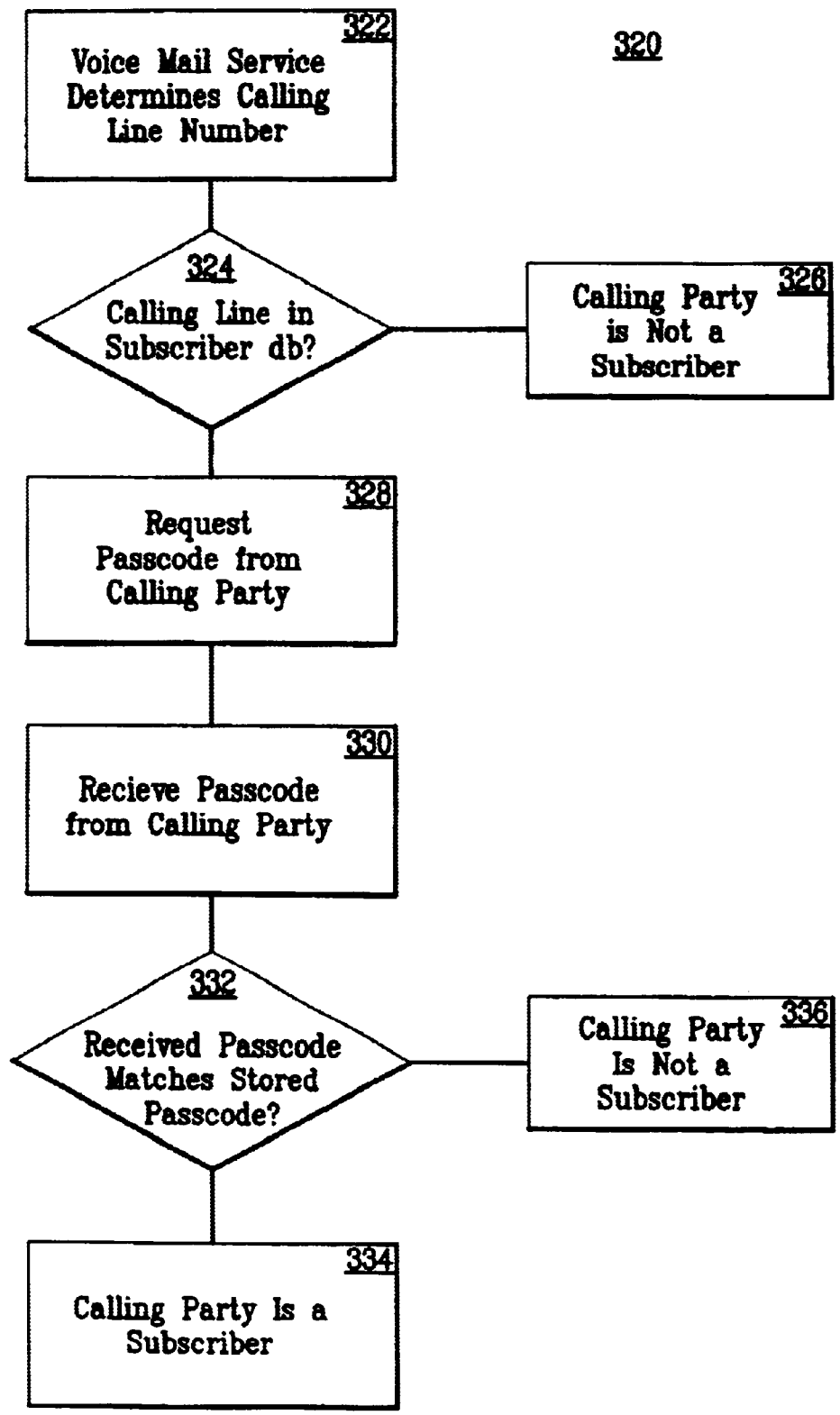

Optionally, but preferably, at step 304, the system authenticates the calling party before connecting the calling party to the voice mailbox. That is, the system determines whether the calling party is a subscriber to the voicemail witness service. FIG. 3B provides a flowchart of a method 320 for authenticating a calling party as a subscriber to a voicemail witness service. At step 322, the system determines the calling line number of the calling line on which the incoming call is received. Techniques for determining calling line number, such as automatic number identification (ANI), for example, are well known in the art and, therefore, are not described in detail herein.

The system includes a data store that contains a respective calling line number associated with each subscriber to the voicemail witness service. After determining the calling line number, the system, at step 324, determines whether the calling line number is in the data store. If the calling line number is in the data store, then, in one embodiment of the invention, the calling party is confirmed as a subscriber to the system, and the incoming call is connected to the voice mailbox associated with the voicemail witness service. If the calling line number is not in the data store, then, at step 326, the incoming call is not connected to the voice mailbox associated with the voicemail witness service. If the calling line number is not in the data store, then the incoming call can be terminated, for example, with or without a message to the calling party indicating that the call is being terminated because the calling party is not a subscriber to the service.

In another embodiment, the system could request a passcode from the calling party at step 328 before connecting the incoming call to the voice mailbox associated with the voicemail witness service. In such an embodiment, the data store also contains a respective passcode corresponding to each calling line number. Then, even if the calling line number is in the database, the system does not connect the incoming call to the voice mailbox associated with the voicemail witness service unless the calling party also enters a passcode that corresponds to the calling line number. In this way, the system can protect against unauthorized callers creating voicemail witness records.

The calling party provides a passcode at step 330. At step 332, the system determines whether the received passcode is in the data store and is associated with the calling line number. That is, the system determines whether the passcode matches the calling line number. If, at step 332, the system determines that the received passcode matches the calling line number, then the system determines, at step 334, that the calling party is a subscriber. If, at step 332, the system determines that the received passcode does not match the calling line number, then the system determines, at step 336, that the calling party is not a subscriber.

Referring once again to FIG. 3A, if, at step 304, the system determines that the calling party is a not a subscriber, the system terminates the call at step 306. In another embodiment, the system does not require the calling party to be a subscriber and, therefore, no authentication is performed. In such an embodiment, the system skips step 304, thereby allowing any calling party to access the voicemail witness service at any time. The party offering the voicemail witness service could charge the calling party on a per use basis, or not at all.

If, at step 304, the system determines that the calling party is a subscriber, or if the system is implemented to skip step 304, the system connects the incoming call to a voice mailbox associated with the voicemail witness service at step 308.

At step 310, the system associates an extended timeout period with the incoming call. A typical voice mailbox records calls of up to about three minutes. According to the invention, the voice mailbox associated with the voicemail witness service can record an incoming call for a period that is considerably longer than the period for which a conventional voicemail service records an incoming call. Preferably, the extended timeout period is about an order of magnitude longer than the conventional timeout period. For example, where the conventional timeout period is about three minutes, the extended timeout period can be about 30 minutes. Thus, the voice mailbox associated with the voicemail witness service can record an incoming call for an extended period, such as for up to 30 minutes, for example.

At step 312, the system begins recording the incoming call. That is, the system begins storing telecommunication data received over the calling line for up to the extended timeout period. The system stores a value representing the extended timeout period associated with the incoming call. When the system starts recording, a timer is initialized (e.g., set to zero or to the value of the extended timeout period, for example). When the timer expires (i.e., when the extended timeout period has elapsed), the timer notifies the recording means and the system stops recording the incoming call.

Preferably, if, at step 314, the system determines that extended timeout period has expired before the call is properly terminated, then, at step 316, the system provides a notification to an emergency service, such as the police. Proper termination of a voicemail witness call is described in detail below. In a preferred embodiment, the system initiates a call to an emergency services telephone number, such as 911, for example, and provides a message to the emergency service that notifies the emergency service that the calling party is in need of help. Preferably, the message is a data packet that is dispatched over the web to a network, such as a telephone network maintained by an emergency service, such as 911, for example.

Preferably, the data packet includes the identity and location of the calling party. The identity of the calling party can be found using a reverse white pages directory. Techniques for using automated white pages directories to determine the identity of a calling party based on the calling line number are well known and, therefore, are not described in detail herein.

Alternatively or additionally, the calling party can state his name and location at the beginning of the voicemail message. In this way, the voicemail witness record itself will contain a record of the calling party's name and location. It is contemplated, however, that the calling party might not be able to leave such a record. For example the perpetrator might be close at hand and the calling party does not want the perpetrator to know that the event is being recorded. Accordingly, it is contemplated that the location of the calling party can be found using global positioning satellite (GPS) technology as is known in the art.

Figure 3C:
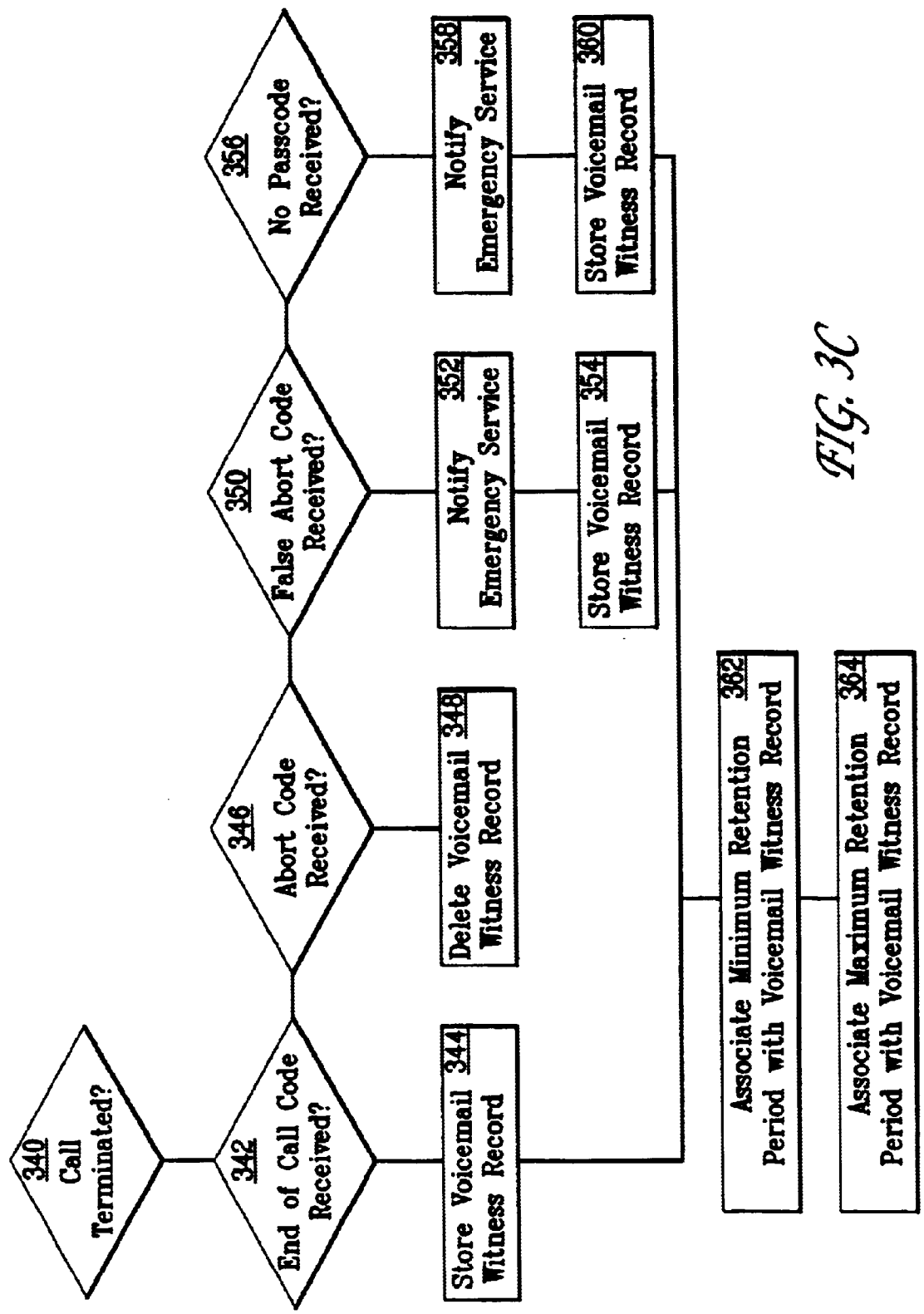

Referring now to FIG. 3C, at step 340, the system determines whether the call is terminated before the extended timeout period expires. Techniques for detecting the termination of a call are well-known and, consequently, will not be described in detail herein. For example, the voicemail service can pass a release signal to the service node when the voicemail system detects that the call has been terminated. The service node signals the calling party CO, which, in turn, signals the called party CO that the call has been terminated.

There are a number of reasons that the call might be terminated before the extended timeout period expires. For example, the calling party might have determined that the event was non-threatening and, therefore, that there is no need for a voicemail witness record. On the other hand, the perpetrator might have discovered the telephone, and the fact that the event was being recorded, and turned off the phone or otherwise terminated the call. Additionally, if the calling party fears that the event is threatening, premature termination of the call could be used as a signal to the emergency services that the calling party needs help.

Accordingly, when the system detects, at step 340, that the call is terminated, the system provides the calling party with options to save the voicemail witness record (i.e., the situation was real), or to delete the voicemail witness record (i.e., the situation was a false alarm). The system can provide a prerecorded menu such as "press or say '1' to save the record; press or say '2' to delete the record." Additionally, the system can store a retention passcode and a deletion passcode associated with the calling party. If, at step 342, the system determines that the calling party has entered the retention passcode or otherwise asked to save the voicemail witness record, the voicemail witness service stores the record in memory at step 344. If, at step 346, the system determines that the calling party has entered the deletion passcode or otherwise asked to have the record deleted, the voicemail witness service does not store the record in memory (or otherwise deletes the record from the voice mailbox) at step 348.

If, at step 350, the system determines that the calling party has entered a false abort passcode (e.g., any passcode other than a passcode stored for that calling party), it is assumed that the calling party needs help. This scenario could arise where the perpetrator finds that the victim is recording and demands that the victim stops recording and delete the record. The perpetrator could be fooled by the victim's entering a false abort code. The system could respond with a message that sounds like the record was deleted, but all the while the system is notifying an emergency service of the situation, at step 352, and storing the voicemail witness record at step 356.

If the call is terminated, and the system determines, at step 356, that the calling party has not entered any passcode at all, it is assumed that the calling party needs help. Accordingly, if the calling does not respond to the system's request for a passcode within predefined time period (a representation of which is stored in the voicemail system's memory), then, at step 358, the system notifies the emergency service as described above. In this way, the calling party can simply end the call to the voicemail witness service to notify authorities. Similarly, if the perpetrator finds the phone and turns it off or forces the victim to turn it off, the system will notify the authorities. If such is the case, the system generates a voicemail witness record, at step 360, by storing the received telecommunication data.

If the situation is such that the system generates a voicemail witness record of the audible event, the system, at step 362, associates a minimum retention period with the record. According to the invention, the voicemail witness record cannot be deleted, even by the calling party, until a certain period of time has elapsed. This gives the victim time to get out of the situation, and decide whether the record should be saved. In this way, if someone (like the perpetrator, for example) tries to delete the record before the minimum timeout period expires, the system will not allow it.

The system also associates a maximum retention period with the voicemail witness record, at step 364, and stores a representation of the maximum retention period in memory. This maximum retention period represents the maximum length of time that the voicemail witness service will retain the record, unless the calling party explicitly requests that the service retain the record longer (described in greater detail below). Thus, even if the calling party never calls back to request deletion or retention of the record, the system can free up valuable memory by deleting the record after the maximum retention period has expired.

Figure 3D:
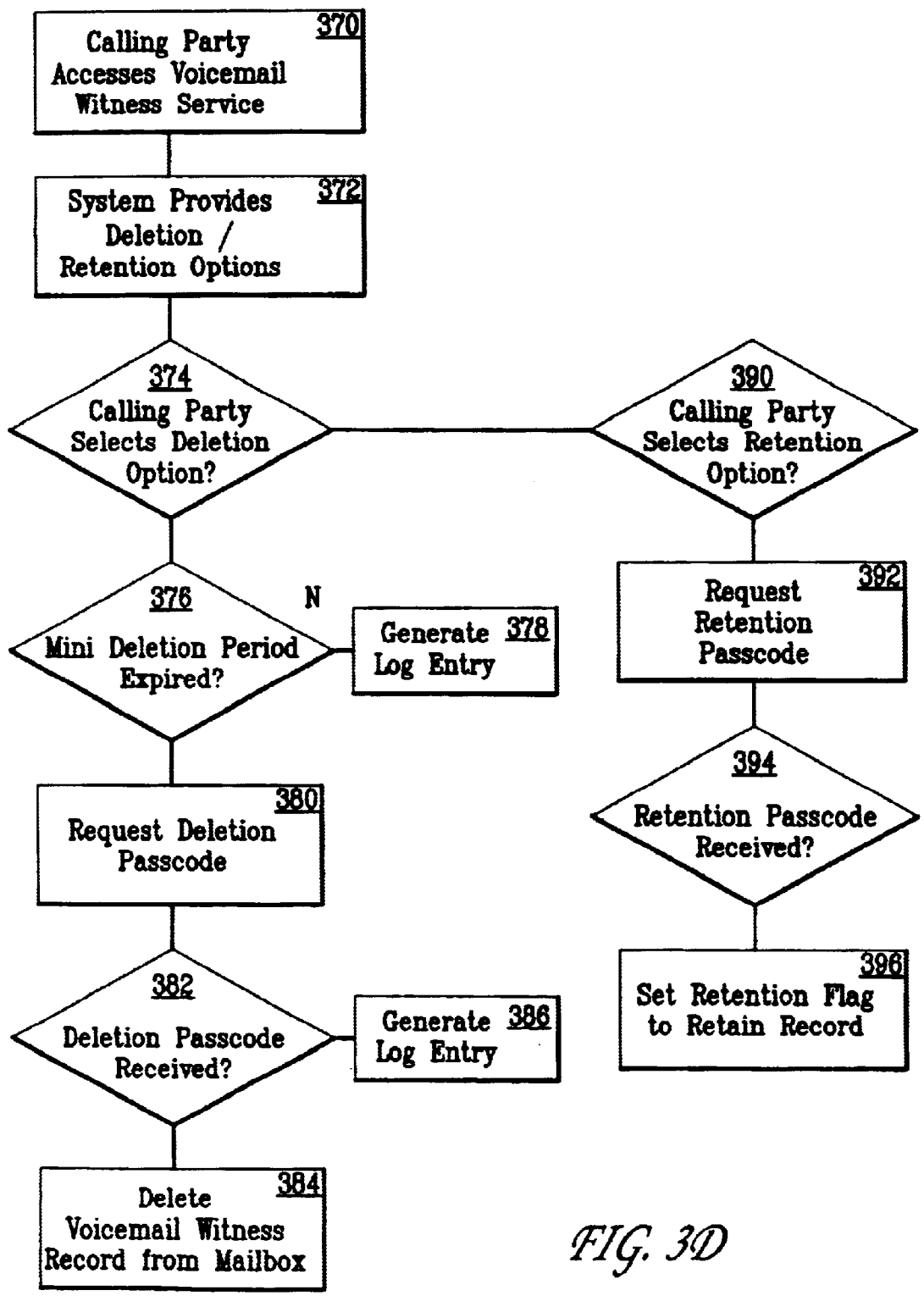

After the voicemail witness record has been generated and stored to memory, the calling party can ask to have the record deleted or retained beyond the maximum retention period. With reference to FIG. 3D, the calling party accesses the voice mail witness service, at step 370. At step 372, the voice mail witness service provides an option to the calling party to delete the existing voicemail witness record. The voicemail witness service also provides an option to retain an existing voicemail witness record beyond the maximum retention period.

If, at step 374, the system determines that the calling party has selected the deletion option, then the system determines, at step 376, whether the record has been stored for at least the minimum retention period. If it has not, the voicemail witness service informs the calling party that the record cannot be deleted because the minimum deletion period has not expired. The voicemail witness can also be programmed to interpret this request as a violation, and generate a log entry, at step 378, that an attempt was made to delete the record prematurely. The log entry can include, for example, the calling line number, in case that information is needed later to show that an unauthorized party, such as the perpetrator, for example, attempted to delete the record. The system can associate a log with each voicemail witness record. The log can contain data that might not be contained in the voicemail witness record of the audible event.

If, at step 376, the system determines that the minimum deletion period has expired, then, at step 380, the system requests a deletion passcode from the calling party. The deletion passcode can be the same as the authentication passcode described above, or it could be a distinct passcode. In any event, the voicemail witness service can associate a predefined deletion passcode with the calling party, and store the deletion passcode in the data store. The system can request the deletion passcode before the option to retain the voicemail witness record is provided, or after the calling party selects the option to retain the voicemail witness record.

If, at step 382, the system determines that the calling party has requested deletion of the stored voicemail witness record and provided the proper deletion passcode, then the system, at step 384, deletes the voicemail witness record (e.g., removes the voicemail witness record from memory). If the system determines that an incorrect deletion passcode has been entered, then, at step 386, the system can generate a log entry of the invalid deletion attempt.

Alternatively, the calling party can request that the voicemail witness record be retained beyond the maximum retention period. This is the option that the calling party would select if the audible event that was recorded is a real incident, and the calling party wishes to save the voicemail witness record for evidence of the event. If, at step 390, the system determines that the calling party has selected the option to retain the voicemail witness record, then, at step 392, the system requests a retention passcode from the calling party. The retention passcode can be the same as either of both of the passcode described above, or it can be a distinct retention passcode. In any event, the voicemail witness service can associate a predefined deletion passcode with the calling party and store the deletion passcode in the data store. Preferably, the user can initialize or change the deletion passcode. The system can request the retention passcode, at step 392, before the option to retain the voicemail witness record is provided (i.e., before step 374), or after the calling party selects the option to retain the voicemail witness record (as shown in FIG. 3D).

If, at step 394, the system determines that the calling party has selected the option to retain the voicemail witness record and enters the proper retention passcode, then, at step 396, the system sets a flag in memory associated with the voicemail witness record. The system checks the flag when the maximum retention period has expired. If the flag indicates that the record is to be retained, the system does not delete the record. Otherwise, when the maximum retention period expires, the system deletes the record from the voice mailbox associated with the voicemail witness service.

The following scenario provides an example of how the invention may be used. While driving home late one evening, a woman sees the dreaded blue lights in her rear view mirror. She pulls off the side of the highway and stops her car but she is not sure whether the person in the vehicle with blue lights is really a police officer. She quickly dials in to her voice mail system and enters 911 on her cellular phone to activate the voicemail witness service. She places her cellular phone under the driver's seat and, while waiting for the person to walk up to her car, she states her location. The person does turn out to be a police officer who informs her that she was speeding and that she will receive a warning ticket. After giving her the warning the officer drives off. She breathes a sigh of relief and retrieves her cellular phone from underneath her seat. Since she is no longer in danger, she enters her password to deactivate the voicemail witness service.

An alternative scenario that could have happened is that the "officer" is an impersonator and the woman starts to feel uneasy as he is walking up to her car. She quickly dials in to her voice mail and activates the voicemail witness service. Before the "officer" reaches the woman's car, she was able to give a complete description of the "officer," license plate number, and location to the voicemail witness. When she is asked to hand over her driver's license, she pretends to drop her license and she turns her cellular phone, which is underneath her seat. Since the call was terminated without the correct passcode having been entered, the recording is sent immediately to the appropriate emergency service for that area. For example, the recording, along with the calling party's identification information, can arrive at a 911 operator's terminal. The operator sees on her terminal that there is a voicemail witness alert and the name and number of the person who activated the recording from the caller id information. The operator knows that she is to listen to the recording. From the recording, the 911 operator is able to identify the caller's location and the real police officers arrive at the scene before the driver who activated the voicemail witness is harmed.

Thus, there have been described systems and methods for systems and methods for recording an audible event via a voicemail witness service. Those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

We claim:

1. A method for recording an audible event, the method comprising:

receiving on a first calling line of a system comprising a first timeout period associated, with a mailbox of a voice mail service; an incoming call from a calling party;

connecting the incoming call to a voice mailbox associated with a voicemail witness service;

associating a extended timeout period with the incoming call, wherein said extended timeout period is greater than said first timeout period;

receiving over the incoming call, for up to the extended timeout period, telecommunications data associated with an audible event;

generating a voicemail witness record by storing a representation of the received telecommunications data and associating the stored representation with the calling party;

associating a minimum record retention period with the voicemail witness record;

receiving a first passcode from the calling party;

comparing the first passcode to a stored passcode associated with the voicemail witness record; and determining whether the minimum record retention period has expired, deleting the voicemail witness record from the voice mailbox if the minimum record retention period has expired and the first passcode matches the stored passcode; and providing a notification to an emergency service if the minimum record retention period has not expired.

2. A method in accordance with claim 1, further comprising:

receiving an authorized deletion request associated with a subscriber and the voicemail witness record; and deleting the voicemail witness record from the voice mailbox.

3. A method in accordance with claim 1, further comprising:

providing a notification to an emergency service if the first passcode does not match the stored passcode.

4. A method in accordance with claim 1, further comprising:

receiving a confirmation passcode from the calling party;

comparing the confirmation passcode to the stored passcode; and providing a notification to an emergency service if neither the first passcode nor the confirmation passcode matches the stored passcode.

5. A method in accordance with claim 1, wherein generating the voicemail witness record comprises storing a representation of the location of the calling party.

6. A method in accordance with claim 1, further comprising:

determining the calling line number;

determining from the calling line number whether the calling party is a subscriber to the voice mail witness service; and generating the voicemail witness record only if the calling party is a subscriber.

7. A method in accordance with claim 1, further comprising:

associating a maximum record retention period with the voicemail witness record;

determining whether the maximum record retention period has expired; and deleting the voicemail witness record if the maximum record retention period has expired.

8. A method in accordance with claim 3, further comprising:

receiving an authorized deletion request associated with a subscriber and the voicemail witness record; and deleting the voicemail witness record from the voice mailbox.

9. A method in accordance with claim 3, further comprising:

comparing the first passcode to the stored passcode associated with a subscriber; and deleting the voicemail witness record from the voice mailbox if the first passcode matches the stored passcode.

10. A method in accordance with claim 9, further comprising:

providing a notification to an emergency service if the first passcode does not match the stored passcode.

11. A method in accordance with claim 9, further comprising:

receiving a confirmation passcode from the calling party;

comparing the confirmation passcode to the stored passcode; and providing a notification to an emergency service if neither the first passcode nor the confirmation passcode matches the stored passcode.

12. A method in accordance with claim 3, wherein generating the voicemail witness record comprises storing a representation of the location of the calling party.

13. A method in accordance with claim 3, further comprising:

determining the calling line number;

determining from the calling line number whether the calling party is a subscriber to the voice mail witness service; and generating the voicemail witness record only if the calling party is a subscriber.

14. A method in accordance with claim 3, further comprising:

associating a maximum record retention period with the voicemail witness record;

determining whether the maximum record retention period has expired; and deleting the voicemail witness record from the voice mailbox if the maximum record retention period has expired.

15. A method in accordance with claim 5, further comprising:

providing a notification to an emergency service if the first passcode does not match the stored passcode.

16. A method in accordance with claim 5, further comprising:
receiving a confirmation passcode from the calling party;
comparing the confirmation passcode to the stored passcode; and
providing a notification to an emergency service if neither the first passcode nor the confirmation passcode matches the stored passcode.

17. A method in accordance with claim 5, wherein generating the voicemail witness record comprises storing a representation of a location of the calling party.

18. A method in accordance with claim 5, further comprising:
determining the calling line number;
determining from the calling line number whether the calling party is a subscriber to the voice mail witness service; and
generating the voicemail witness record only if the calling party is a subscriber.

19. A method in accordance with claim 5, further comprising:
associating a maximum record retention period with the voicemail witness record;
determining whether the maximum record retention period has expired; and
deleting the voicemail witness record from the voice mailbox if the maximum record retention period has expired.

20. A method for recording an audible event, the method comprising:
receiving on a first calling line, an incoming call from a calling party;
connecting the incoming call to a voice mailbox associated with a voicemail witness service;
associating an predetermined timeout period with the incoming call;
receiving over the first calling line, for up to the predetermined timeout period, telecommunications data associated with an audible event;
generating a voicemail witness record by storing a representation of the received telecommunications data and associating the stored representation with the calling party;
associating a maximum record retention period with the voicemail witness record;
receiving a passcode from a calling party;
comparing the received passcode to a stored passcode associated with the voicemail witness record;
determining whether the maximum record retention period has expired, providing a notification to an emergency service if a minimum record retention period has not expired; and
if the received passcode matches the stored passcode, retaining the voicemail witness record beyond the maximum record retention period.

21. A method for recording an audible event, the method comprising:
receiving on a first calling line, an incoming call from a calling party;
connecting the incoming call to a voice mailbox associated with a voicemail witness service;
associating a notification timeout period with the incoming call;
receiving over the first calling line, telecommunications data associated with the audible event;
generating a voicemail witness record by storing a representation of the received telecommunications data and associating the stored representation with a subscriber to the voicemail witness service;
providing a notification to an emergency service if the notification timeout period expires before the call is terminated,
associating a minimum record retention period with the voicemail witness record;
receiving a first passcode from a calling party;
comparing the first passcode to a stored passcode associated with the voicemail witness record;
determining whether the minimum record retention period has expired;
deleting the voicemail witness record from the voice mailbox if the minimum record retention period has expired and the first passcode matches the stored passcode; and
providing a notification to an emergency service if the minimum record retention period has not expired.

22. A method for recording an audible event, the method comprising:
receiving on a first calling line, an incoming call from a calling party;
connecting the incoming call to a voice mailbox associated with a voicemail witness service;
associating a notification timeout period with the incoming call;
receiving over the first calling line, telecommunications data associated with the audible event;
generating a voicemail witness record by storing a representation of the received telecommunications data and associating the stored representation with a subscriber to the voicemail witness service;
providing a notification to an emergency service if the notification timeout period expires before the call is terminated and a minimum record retention period of said record has not expired;
associating a maximum record retention period with the voicemail witness record;
receiving a passcode from a calling party;
comparing the received passcode to a stored passcode associated with the voicemail witness record;
determining whether the maximum record retention period has expired; and
if the received passcode matches the stored passcode, retaining the voicemail witness record beyond the maximum record retention period.

23. A method for recording an audible event, the method comprising:
receiving on a first calling line, an incoming call from a calling party;
connecting the incoming call to a voice mailbox associated with a voicemail witness service;
receiving over the first calling line, telecommunications data associated with the audible event;
generating a voicemail witness record by storing a representation of the received telecommunications data and associating the stored representation with a subscriber to the voicemail witness service;
associating a minimum record retention period with the voicemail witness record;

receiving a first passcode from a calling party;

comparing the first passcode to a stored passcode associated with the voicemail witness record; and determining whether the minimum record retention period has expired;

deleting the voicemail witness record from the voice mailbox if the minimum record retention period has expired and the first passcode matches the stored passcode, and providing a notification to an emergency service if the minimum record retention period has not expired.

24. A method for recording an audible event, the method comprising:

receiving on a first calling line, an incoming call from a calling party;

connecting the incoming call to a voice mailbox associated with a voicemail witness service;

receiving over the first calling line, telecommunications data from the incoming call associated with the audible event;

generating a voicemail witness record by storing a representation of the received telecommunications data and associating the stored representation with a subscriber to the voicemail witness service;

associating a minimum record retention period with the voicemail witness record;

receiving a first passcode from a calling party;

comparing the first passcode to a stored passcode associated with the voicemail witness record;

determining whether the minimum record retention period has expired;

deleting the voicemail witness record from the voice mailbox if the minimum record retention period has expired and the first passcode matches the stored passcode; and associating a maximum record retention period with the voicemail witness record;

receiving a retention passcode from a calling party;

comparing the retention passcode to a stored passcode associated with the voicemail witness record;

determining whether the maximum record retention period has expired; and if the retention passcode matches the stored passcode, retaining the voicemail record beyond the maximum record retention period.

\* \* \* \* \*